(12) United States Patent
Barker et al.

(10) Patent No.: US 6,334,215 B1
(45) Date of Patent: Dec. 25, 2001

(54) METHODOLOGY FOR MIGRATION OF LEGACY APPLICATIONS TO NEW PRODUCT ARCHITECTURES

(75) Inventors: Brian C. Barker, Poughkeepsie; Perry G. Hartswick, Millbrook, both of NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/305,431

(22) Filed: May 5, 1999

(51) Int. Cl.$^7$ .................................................. G06F 9/445
(52) U.S. Cl. ................................. 717/11; 717/4; 717/5; 717/7; 707/4
(58) Field of Search ............................... 717/11, 4, 5, 7; 707/4, 100; 709/231; 710/126

(56) References Cited

U.S. PATENT DOCUMENTS

| | | | |
|---|---|---|---|
| 5,359,730 | * 10/1994 | Marron | 717/11 |
| 5,806,067 | * 9/1998 | Connor | 707/100 |
| 5,815,149 | * 9/1998 | Mutschler, III et al. | 345/335 |
| 5,828,897 | * 10/1998 | Kirsch et al. | 712/43 |
| 5,899,990 | * 5/1999 | Maritzen et al. | 707/4 |
| 6,223,180 | * 4/2001 | Moore et al. | 707/100 |
| 6,247,172 | * 6/2001 | Dunn et al. | 717/5 |
| 6,253,244 | * 6/2001 | Moore et al. | 709/231 |
| 6,266,729 | * 7/2001 | Leung et al. | 710/126 |

OTHER PUBLICATIONS

Title: Managing Semantic Heterogeneity in Databases: A Theoritical Perspective, Author: Hull et al, ACM, 1997.*
Title: Reuse of Off–the_shelf Components in C2 –Style Architecutres, Authour: Medvidovic et al, ACM, 1997.*

* cited by examiner

*Primary Examiner*—Mark R. Powell
*Assistant Examiner*—Chameli C. Das
(74) *Attorney, Agent, or Firm*—Ratner & Prestia; Tiffany L. Townsend, Esq.

(57) ABSTRACT

A method for migrating legacy applications into a new software product architecture using a functional conversion module located within a system controller. The functional conversion module comprises a migration plan shut off. The functional conversion module further comprises three paths or branches through which a functional request can be routed. Functional requests which are not identified in the migration plan are routed through the first path and the functional request is sent to the pre-existing software and executed as requested. Functional requests identified in the migration plan for which the pre-existing software is in control are routed through the second path, and the functional request is sent to the pre-existing software and executed as received. In the background, the functional request is translated for the new software and sent to the new software and executed. Functional requests identified in the migration plan for which the new software is in control are routed through the third path, and the functional request is translated for the new software and sent to the new software and executed. If the pre-existing software has been shut off, the task is complete. If the pre-existing software is not identified as being shut off, the functional request is sent to the pre-existing software and executed as received in the background. Duplicate requests are suppressed by the system controller.

5 Claims, 4 Drawing Sheets

METHODOLOGY FOR MIGRATION OF LEGACY APPLICATIONS TO NEW PRODUCT ARCHITECTURES

TECHNICAL FIELD

The present invention is generally directed to a methodology for migration of existing computer software systems and, more particularly, to a methodology for migration of legacy applications to new software product architectures.

BACKGROUND OF INVENTION

The following terms when used in relation to computer code or computer functions shall have the meanings provided.

(1) "Application" refers to a single set of functions that support a specific requirement. For example, in computer integrated manufacturing, production equipment maintenance (PEM) can be supported by a PEM application.

(2) "System" refers to a collection of applications that support an overall business. For example, in computer integrated manufacturing, the overall manufacturing business can be supported by a manufacturing execution system (MES).

(3) "Architecture" refers to the foundation and guidelines that all systems within a business follow. For example, for a host-based architecture, host configuration, network design, and data access are all part of the architecture.

(4) "Platform" refers to sections of the foundation for the overall system. For example, Windows NT® is a platform.

Migration of legacy applications is imperative in the modern manufacturing environment. For example, semiconductor manufacturers need to find ways to extend the life of their existing fabricators despite limitations on existing computer integrated manufacturing (CIM) systems; specifically, such systems cannot support state-of-the-art process control technology. Existing systems have been in place for many years and have evolved into their present condition. With the creation of object technology, frameworks, and other system developments, CIM products are now capable of handling the latest process technology through the use of "plug-and-play" modules. Current CIM products also have the ability to implement business practice changes rapidly and without massive programming efforts.

Unfortunately, the migration of legacy software applications (e.g., pre-existing applications performed by a predecessor software system) to new architectures is difficult and expensive. Each legacy application is typically intertwined with other applications to such an extent that migrating any one section of a system would have a negative impact on many other sections of the system. The only available alternative has been migration of the entire legacy platform. This alternative is prohibitive, however, given the substantial resources requirements, both in costs and labor, and resulting extended system down time.

The deficiencies of the conventional attempts to migrate legacy software applications to new architectures show that a need still exists for an improved migration methodology. To overcome the shortcomings of the conventional attempts, a new methodology is provided. An object of the present invention is to provide an economic method for migrating legacy applications into a new product architecture which minimizes system down time. It is a further object of this invention to provide a method for migrating legacy applications in which current data are maintained on the legacy applications for a sufficient period of time to provide a back out option until the application can be verified on the new product architecture.

SUMMARY OF THE INVENTION

To achieve these and other objects, and in view of its purposes, the present invention provides a method for migrating legacy applications into a new software product architecture. The key to the invention is a functional conversion module located within a system controller which comprises a migration plan (e.g., database) identifying functional requests to be migrated, whether the pre-existing software or new software is in control, and whether the pre-existing software has been shut off. The functional conversion module further comprises three paths or branches through which a functional request can be routed.

Functional requests which are not identified in the migration plan are routed through the first path and the functional request is sent to the pre-existing software and executed as requested. Functional requests identified in the migration plan for which the pre-existing software is in control are routed through the second path, and the functional request is sent to the pre-existing software and executed as received. In the background, the functional request is translated for the new software and sent to the new software and executed. Functional requests identified in the migration plan for which the new software is in control are routed through the third path, and the functional request is translated for the new software and sent to the new software and executed. If the pre-existing software has been shut off, the task is complete. If the pre-existing software is not identified as being shut off, however, the functional request is sent to the pre-existing software and executed as received in the background. Duplicate requests are suppressed by the system controller.

The present invention provides considerable improvement over conventional migration systems. The present invention provides the ability to migrate legacy applications incrementally, without having to shut down the system for prolonged periods of time. The present invention further provides the ability to test new applications using real data and interfaces. Finally, the present invention provides an easy back out plan, using pre-existing software, which can be maintained for a period of time after migration.

It is to be understood that both the foregoing general description and the following detailed description are exemplary, but are not restrictive, of the invention.

BRIEF DESCRIPTION OF THE DRAWING

The features and advantages of a method for migrating legacy applications to new product architectures according to the present invention and a functional conversion module for use in migrating legacy applications to new product architectures and further details of the structure and process for such a migration plan will be best understood from the following detailed description when read in conjunction with the accompanying drawing. Included in the drawing are the following figures.

DETAILED DESCRIPTION OF THE INVENTION

The present invention will be described in detail with reference to the accompanying figures. The present invention provides a method for migrating legacy applications to a new product architecture using a functional conversion module in a system controller.

I. Map and Isolate Target Applications

The method begins by mapping the pre-existing software architecture for target applications (i.e., pre-existing software applications targeted to be migrated). All external interfaces (connections external to the target applications) must be identified. Business practices are documented against the target applications used to support each practice.

Next, the target applications are isolated. To isolate the target applications, one or more applications may need to be rewritten. For example, when a functional application and a data acquisition application are intertwined, the application is rewritten to separate the two applications. Then, the direct external interfaces to the target applications are broken.

II. Migration

Figure 1:
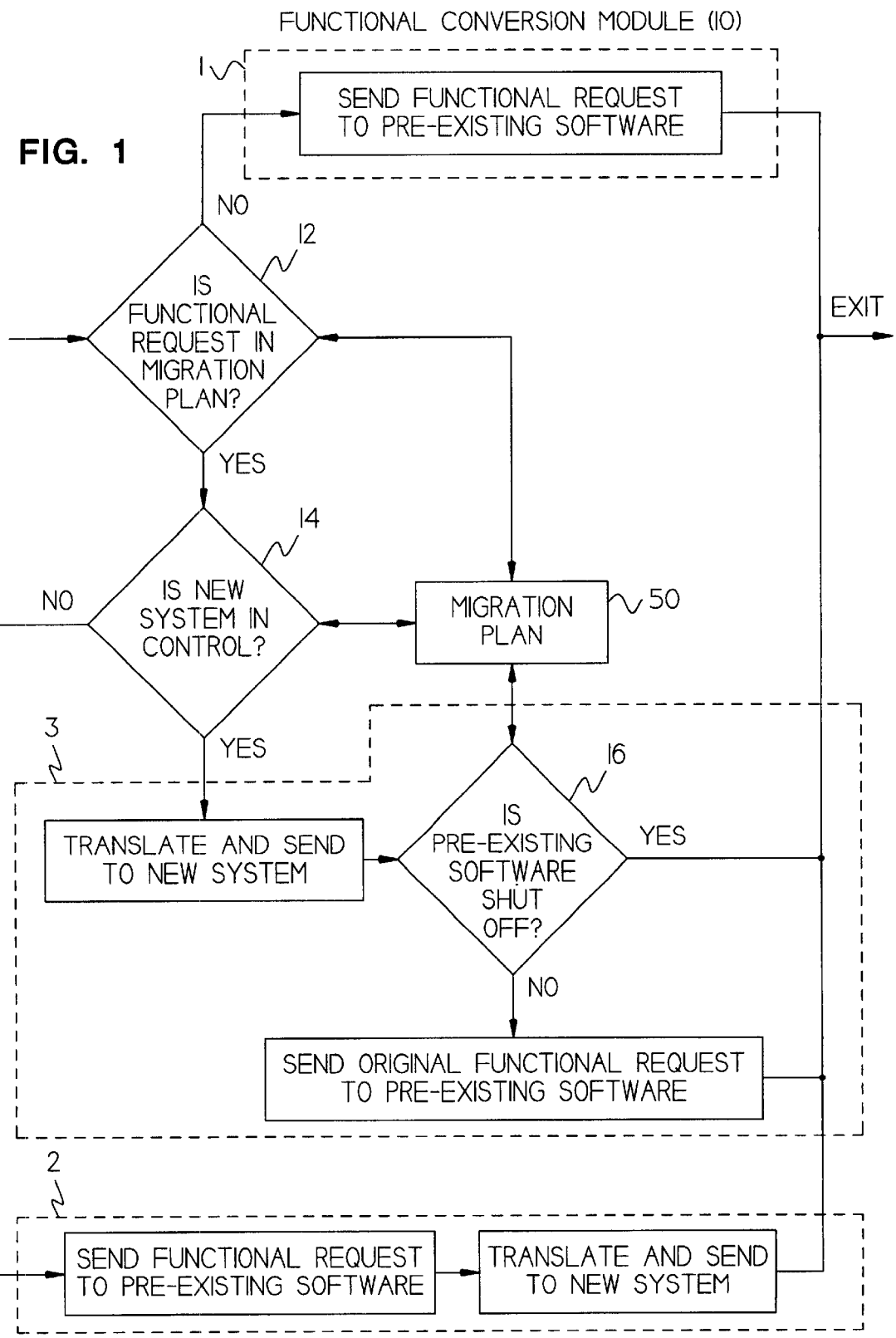
FIG. 1 illustrates the logic flow of a section of controller code for migrating legacy applications according to the present invention.

Referring to FIG. 1, the key to the migration of legacy applications to a new product architecture according to the present invention is a functional conversion module (10) located within a system controller (not shown). The functional conversion module (10) comprises a migration plan (50). Migration plan (50) is a database identifying functional requests to be migrated, whether the pre-existing target software (legacy application; not shown) or the new software (new application; not shown) is in control, and whether the pre-existing target software has been shut off.

Figure 2:
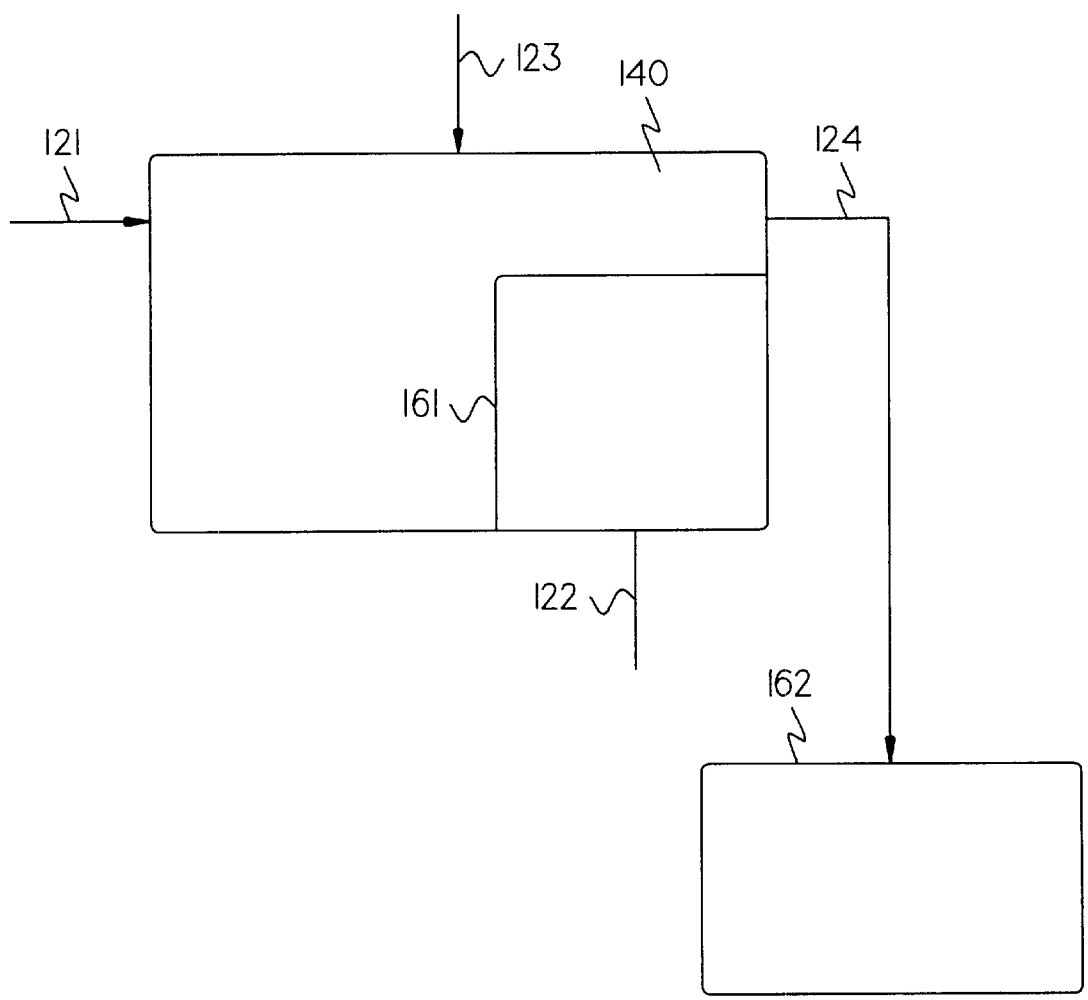
FIG. 2 shows a map of an example pre-existing bill of material (BOM) application targeted for migration.

The functional conversion module (10) is a section of controller code, which is illustrated in FIG. 2 as a logic tree having three branches (paths). The first path (1) is for functional requests not in the migration plan (50). The second path (2) is for functional requests in the migration plan (50) for which the pre-existing target software is in control. The third path (3) is for functional requests in the migration plan (50) for which the new software is in control.

When a functional request is made from outside of the system controller (not shown), it is received by the functional conversion module (10) and routed to a migration plan interrogate function (12). The migration plan interrogate function (12) is a sub-section of the functional conversion module (10) code which compares the functional request with the migration plan (50) to determine whether the function that is being requested is part of the migration plan (50). The migration plan (50) is a database located in functional conversion module (10) which identifies the scope of the migration being performed. This migration plan (50) is used to identify functional requests that are being migrated to a new application and the status of the migration.

Such identification by migration plan (50) may have three results. First, a functional request may be determined not to be part of the migration plan (50). If so, then the functional request is routed via the first path (1) to the pre-existing target software and executed as received.

If a functional request is determined to be part of the migration plan (50), then the functional request is routed to a master interrogate function (14). The master interrogate function (14) is a sub-section of the functional conversion module (10) code. Master interrogate function (14) compares the current functional request with the migration plan (50) to determine whether the pre-existing target software or the new software is in control of that function and, therefore, the functional request.

If the pre-existing software is determined to be in control of a functional request which was determined to be part of the migration plan (50), the functional request is routed to the pre-existing software via path 2 of the functional conversion module (10) and executed as requested. In the background, the functional request is also translated for the new software, routed to the new software, and executed by the new software. The system controller is programmed to suppress duplicate requests.

By executing the functional request on the new software in the background, the new system can be tested for execution of the functional request before switching control to the new software. Because the pre-existing target software is functioning normally, the data collected in the new software can be compared to the data from the pre-existing software to confirm its accuracy before switching control, thereby reducing the risk of data loss during migration. Once the execution of a particular functional request by the new software is verified, the migration plan can be updated such that the new software is placed in control of that function.

If the new software is determined to be in control of a functional request which was determined to be part of the migration plan (50), then the functional request is translated for the new software, routed to the new software via the third path (3), and executed by the new system. The functional request is then routed to a back-up interrogate function (16). The back-up interrogate function (16) is a sub-section of controller code which compares the functional request to the migration plan (50) to determine whether the pre-existing target software has been shut off.

If the pre-existing target software is determined to be shut off for a function for which the new software is determined to be in control of the functional request determined to be a part of the migration plan (50), the task is completed. On the other hand, if the pre-existing target software is determined not to be shut off for a function for which the new software is determined to be in control of a functional request determined to be a part of the migration plan (50), the original request is routed to the pre-existing target software and executed as requested. A key advantage of the present invention is that a functional request can be sent to the functional controller blindly. It does not matter whether the function is part of the migration plan. Therefore, external systems and operators are not affected by the migration.

III. Remove Pre-existing Software

After control of a function has been switched to the new software, the pre-existing target software is operated in the background to serve as a back out contingency if necessary. The pre-existing target software can be removed when sufficient confidence in the new software is achieved. The pre-existing target software should be removed, however, as soon as it becomes outdated.

EXAMPLE

Following is a description of a migration of a material management function from a pre-existing, host-based bill of material (BOM) application (161) that was intertwined with other applications both internal and external to an existing manufacturing execution system (MES) (140) in an existing platform to a client/server application architecture. The new application software is completely separated from the other applications in the existing platform. The following description is provided as an example only, and is not intended as a limitation. It is to be understood that, although the following detailed description illustrates an example of migrating a pre-existing application, the migration of a pre-existing system is also within the scope of this invention.

Referring to FIG. 2, the pre-existing target applications were mapped. The BOM application (161) was built through a separate administrative interface (121) that allowed a part number to be defined as a flow of photo levels. At each photo level, specifications for processing (i.e., stepper program, reticles to be shot, resist type, magnification, and the like) were defined until a complete BOM file existed. The BOM application (161) also maintained reticle counts which counted the number of uses for each reticle for use in determining when reticle requalification was necessary. Reticle bar codes were created as photo masks were delivered from the mask house. In this implementation, the bar code data was manually entered through a reticle interface (122) along with requalification limits.

Each photo tool was designated within the MES (140) as a photo tool (a flag was turned on) which signaled the MES (140) to send photo data to a tool automation application (162) through a tool automation application interface (124) when a lot was being started.

When an operator started a lot through an operator interface (123), the MES (140) generated a CHANGE RETICLE STATUS functional request, which caused the BOM application (161) to increment the reticle counts and to send the data stored in the BOM application (161) to the tool automation application (162) through the tool automation application interface (124). A START TA application functional request was also sent from the MES (140) to the tool automation application (162) through the tool automation application interface (124). The tool automation application (162) loaded the data to the tool to provide the recipes and reticles that were to be loaded for the current lot.

When the lot was completed and the operator unloaded the lot, a transaction was sent back to the MES (140) through the tool automation application interface (124), incrementing the usage counts for the reticles used. These data were used to determine when the reticles needed to be qualified anew.

Figure 3:
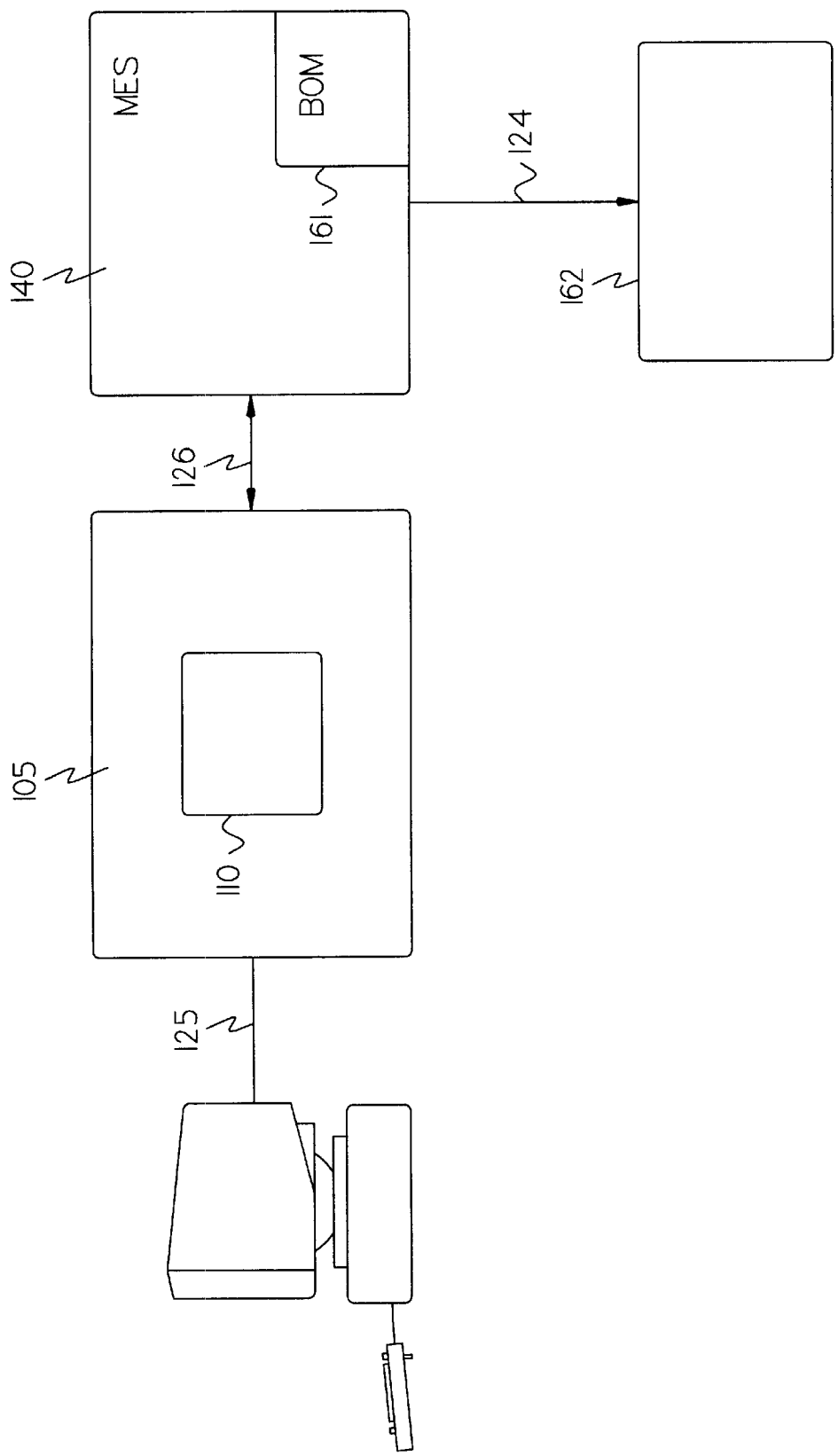
FIGS. 3 and 4 show block diagrams of an example computer integrated manufacturing system illustrating sequential migration steps for migrating a pre-existing BOM application to a new lithography data system (LDS) application according to the present invention.

Referring to FIG. 3, in the first step of the migration, a functional conversion module (110) is installed, and functional requests follow the first path (not shown) of the functional conversion module (110). For clarity, only the migration of the CHANGE RETICLE STATUS functional request will be described in detail, although other functional requests can be migrated in the same manner, and systems can be migrated as well as applications.

A system controller (105) including the functional conversion module (110) is installed as illustrated in FIG. 3. The CHANGE RETICLE STATUS functional request has been selected for migration, but is not yet identified in the migration plan. The functional request will follow the first path (not shown) in the functional conversion module (110). The operator interface (123) between the operator and the MES (140) is broken and a new operator interface (125) is created between the operator and the system controller (105). Also, an MES interface (126) is created between the system controller (105) and the MES (140). An IN sequence is written in the system controller (105) that creates an MES START LOT command upon receipt of a START LOT or IN functional request.

When the operator starts a lot through the new operator interface (125), the functional conversion module (110) receives the START LOT functional request and creates an MES START LOT command. The MES (140) creates a CHANGE RETICLE STATUS functional request. The functional conversion module determines that the CHANGE RETICLE STATUS functional request is not in the migration plan, and the functional request is routed to the BOM application (161) through the MES interface (126). The MES (140) compiles data from the BOM application (161), which is necessary to process the lot. The data is downloaded from the MES (140) to the tool automation application (162) through the tool automation application interface (124). The tool automation application (162) downloads processing data to the photo tool and collects reticle counts from the photo tool.

Figure 4:
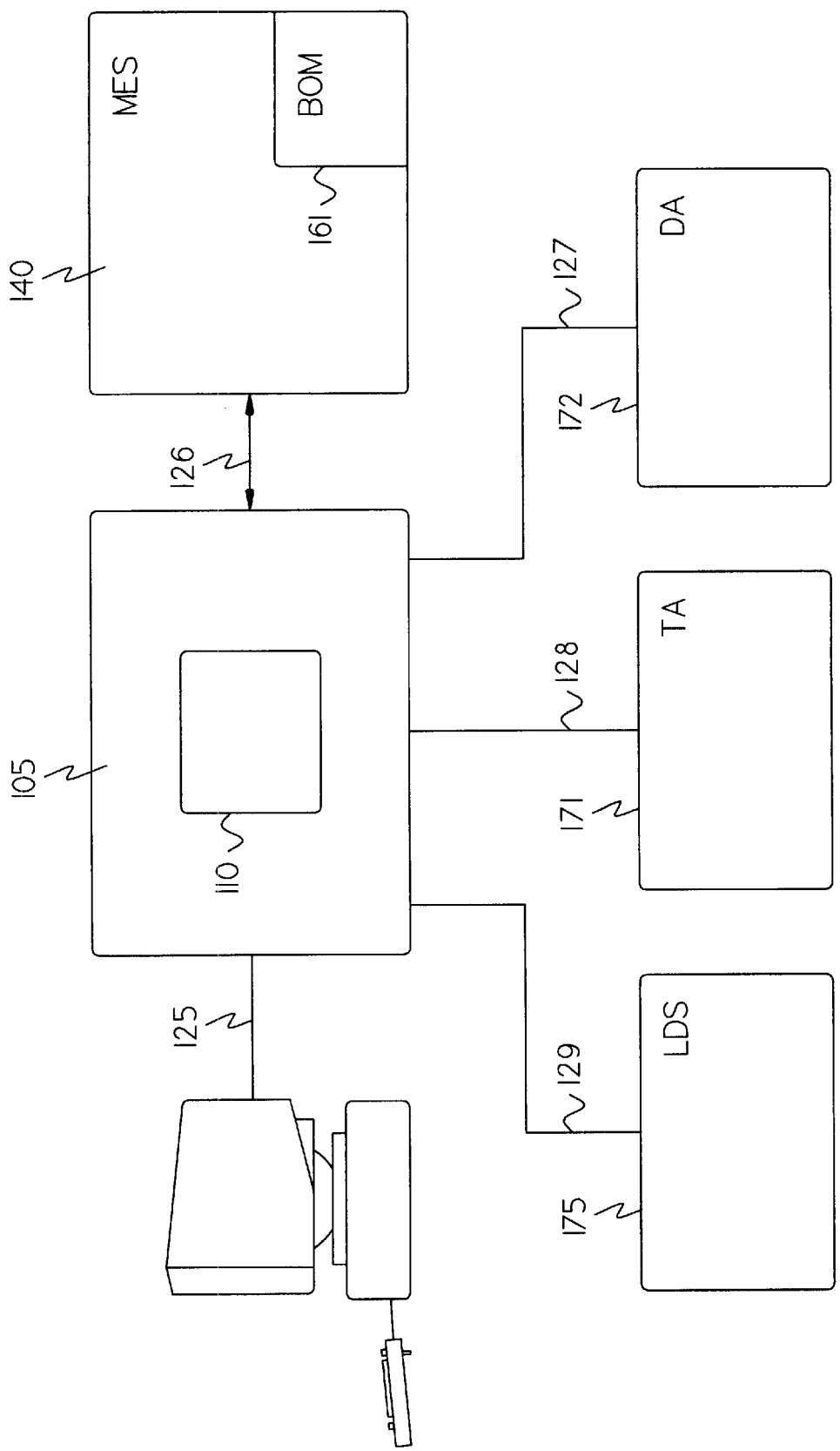

Referring to FIG. 4, the tool automation application (162) is rewritten to provide two separate applications: the tool automation (TA) application (171) and the data acquisition (DA) application (172). A lithography data system (LDS) application (175) is built and installed to control and store photolithography processing specifications and data. The existing data from the BOM application (161) is loaded into the LDS application (175).

The IN sequence in the system controller (105) is modified to add TA GET DATA LDS, TA GET DATA BOM, START TA, and INCREMENT BOM commands. The migration plan is updated to include the CHANGE RETICLE STATUS functional request, for which the migration plan identifies the BOM application (161) as being in control. At this point, the direct tool automation application interface (124) between the MES (140) and the tool automation application (161) is broken, a TA application interface (128) is created between the system controller (105) and the TA application (171), and a DA interface (127) is created between the system controller (105) and the DA application (172). Also, an LDS interface (129) is created between the system controller (105) and the LDS application (175). The CHANGE RETICLE STATUS functional request will now be routed along the second path of the functional conversion module (110).

When the operator makes a START LOT or IN functional request through the operator interface (123), system controller (105) executes the IN sequence commands. The system controller (105) sends the MES START LOT command to the MES (140) through the MES interface (126). The MES (140) creates a CHANGE RETICLE STATUS functional request. The functional conversion module (110) determines that the CHANGE RETICLE STATUS functional request is part of the migration plan and that the BOM application (161) is in control. The functional conversion module (110) sends the CHANGE RETICLE STATUS functional request to the BOM application (161) as received. In the background, the functional conversion module (110) translates the CHANGE RETICLE STATUS functional request for the LDS application (175) and routes it to the LDS application (175).

The IN sequence sends a TA GET DATA BOM command to the DA application (172) through the DA interface (127) and a TA GET DATA LDS command which is suppressed by the system controller (105). The DA application (172) retrieves the necessary processing data from the BOM application (161). The IN sequence also sends a START TA command to the TA application (171) through the TA interface (128). The TA application (171) retrieves the processing data from the DA application (172) through the system controller (105) and downloads it to the photo tool.

The processing data from the BOM application (161) is still being used at this point, but the LDS application (175) data can be readily accessed and tested. Likewise, the suppressed command TA GET DATA LDS can be accessed and tested. Referring again to FIG. 4, the migration plan is updated to indicate that the LDS application (175) is in control. The RETRIEVE RETICLE STATUS functional request will now be routed along the third path in the functional conversion module.

When the operator initiates a START LOT or IN functional request, the system controller initiates the IN sequence. The system controller (105) sends the MES START LOT command to the MES (140) through the MES interface (126). The MES (140) creates a CHANGE RETICLE STATUS functional request. The functional conversion module (110) determines that the CHANGE RETICLE STATUS functional request is part of the migration plan and that the LDS application (175) is in control. The functional conversion module (110) translates the CHANGE RETICLE STATUS functional request for the LDS application (175) and sends it to the LDS application (175). In the background, the functional conversion module (110) determines whether the BOM application (161) has been identified as being shut off in the migration plan. If the BOM application (161) is identified as being shut off in the migration plan, no command is sent to the BOM application (161). If the migration plan identifies the BOM application (161) as not being shut off, the functional conversion module (110) sends a TA GET DATA BOM functional request which is suppressed by the system controller (105).

The IN sequence sends a TA GET DATA LDS command to the DA application (172) through the DA interface (127) and a TA GET DATA BOM command which is suppressed by the system controller (105). The DA application (172) retrieves the necessary processing data from the LDS application (175).

The IN sequence also sends a START TA command to the TA application (171) through the TA interface (128). The TA application (171) retrieves the processing data from the DA application (172) through the system controller (105) and downloads it to the photo tool.

The processing data from the LDS application (175) is being used at this point, but the BOM application (161) data can still be readily accessed and tested. Likewise, the suppressed command TA GET DATA BOM can be accessed and tested.

Although illustrated and described above with reference to certain specific embodiments, the present invention is nevertheless not intended to be limited to the details shown. Rather, various modifications may be made in the details within the scope and range of equivalents of the claims and without departing from the spirit of the invention.

What is claimed is:

1. A method of migrating legacy software applications to new product architectures comprising the steps of:
    developing a migration plan identifying software functions to be migrated from pre-existing software to a new product architecture;
    evaluating each functional request to determine whether that function is part of the migration plan;
    executing those functional requests determined not to be part of the migration plan as received;
    evaluating a functional request determined to be part of the migration plan to determine whether the pre-existing software or the new software is in control;
    executing those functional requests determined to be part of the migration plan for which the pre-existing software is determined to be in control as requested, then translating the request to the new software and executing the functional request on the new software;
    translating those functional requests determined to be part of the migration plan for which the new software is determined to be in control and executing the functional request on the new software;
    evaluating those functional requests determined to be part of the migration plan for which the new software is determined to be in control to determine whether the pre-existing software has been shut off; and
    executing those original functional requests determined to be part of the migration plan for which the new software is determined to be in control and the pre-existing software is determined not to have been shut off.

2. The method of claim 1 wherein the new product architectures include a client/server architecture.

3. The method of claim 1 wherein the new product architectures include a client/server architecture and all evaluation functions are performed by a functional conversion module located in a system controller.

4. A method for migrating legacy applications to new product architectures comprising the steps of:
    mapping and isolating pre-existing software for legacy applications targeted for migration and documenting corresponding functional requests and interfaces to external applications and operators;
    forming a migration plan identifying specific functional requests to be migrated and the migration status of the functional requests;
    installing new applications for the targeted pre-existing applications;
    installing a system controller comprising a functional conversion module that determines whether each functional request is identified in the migration plan and the status of the functional request, routes the functional request to the application software which is identified as being in control by the migration plan, and routes the functional request to the application software not identified as being in control by the migration plan unless the application software not identified as being in control by the migration plan is the pre-existing software which is identified as being shut off by the migration plan;
    breaking direct interfaces between the targeted pre-existing applications and the external applications and the operators;
    creating interfaces between the targeted pre-existing applications and the system controller, between the external applications and operators and the system controller, and between the new applications and the system controller;
    switching control of the functional requests for the targeted applications from the pre-existing software to the new system; and
    updating the migration plan.

5. A functional conversion module, consisting of a plurality of lines of computer code, for use in migrating a legacy application to a new application using new product architecture, the module comprising:
    a migration plan which identifies functional requests to be migrated, whether the legacy application or the new application is in control, and whether the legacy application has been shut off;
    a first path whereby functional requests determined not to be identified in the migration plan are routed to the legacy application and executed as requested;

a second path whereby functional requests determined to be identified in the migration plan, where the legacy application is identified as being in control by the migration plan, are routed to the legacy application and executed as requested, such functional requests being subsequently translated for the new application and routed to and executed by the new application; and a third path whereby functional requests determined to be identified in the migration plan, where the new application is identified as being in control by the migration plan, are translated for, routed to, and executed by the new application, the functional requests where the legacy application is not identified as being shut off by the migration plan being subsequently routed to the legacy application and executed as requested.

\* \* \* \* \*